June 5, 1928.
A. E. LINENDOLL
1,672,266
UNIVERSAL CUT-OUT VALVE
Filed May 11, 1926  2 Sheets-Sheet 1
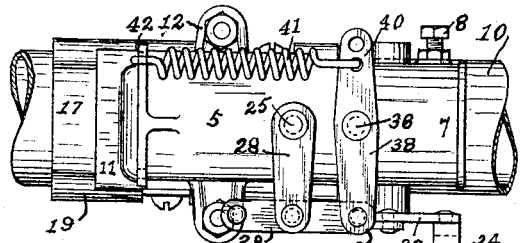
Fig. 1
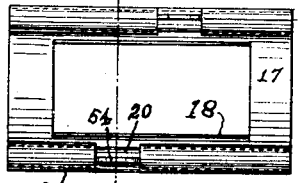
Fig. 4
Fig. 5
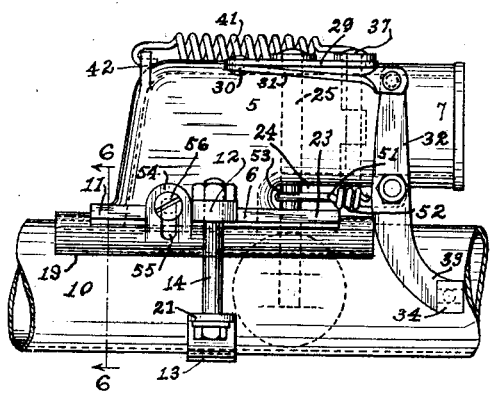
Fig. 2
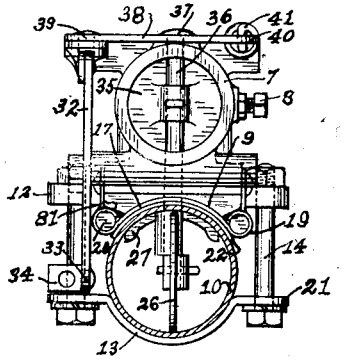
Fig. 3
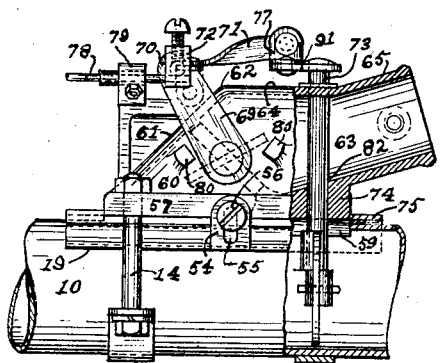
Fig. 6
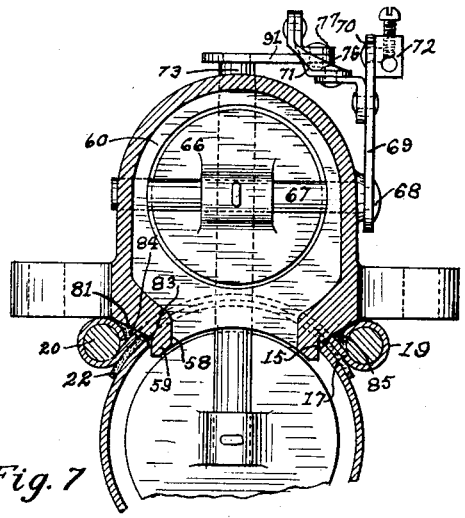
Fig. 7
INVENTOR
Asa E. Linendoll
BY Frank D. Gray
ATTORNEY June 5, 1928.

A. E. LINENDOLL 1,672,266

UNIVERSAL CUT-OUT VALVE

Filed May 11, 1926

INVENTOR
Asa E. Linendoll
BY Frank D. Gray
ATTORNEY

Patented June 5, 1928.

1,672,266

UNITED STATES PATENT OFFICE.

ASA E. LINENDOLL, OF NORWALK, OHIO.

UNIVERSAL CUT-OUT VALVE.

Application filed May 11, 1926. Serial No. 108,264.

This invention relates to universal cut-out valves, and especially to such valves for directing exhaust gases from internal combustion engines to a heating radiator in an automobile, by mounting the valve over an opening in the exhaust pipe from the engine.

Attempts have been made heretofore to seat such valves upon the exhaust pipe, and attempts have been made to provide attachment mechanism for securing such valves of a common size upon exhaust pipes of different size, but they have not been wholly satisfactory. The object of my invention is to provide a cut-out valve which shall positively cut off the exhaust gases from the pipe leading from the engine and divert them through said valve to the auto heater, when such result is desired; or to open the exhaust pipe to permit the gases therein to flow onward through the pipe and positively prevent leakage of such gases up through the valve, when such condition is objectionable. It is a special object of my improved valve mechanism that I provide means for seating the valve upon exhaust pipes of different size without permitting leakage at the point of attachment.

It is a further object of my invention to provide a flexible and apertured member between the valve and the exhaust pipe which may be applied directly to the surface of said pipe over an opening therein and which may be readily bent to fit snugly the curved surface of said pipe, whether the latter is of smaller or larger size, and which will not require attachment between the edges of its aperture and the valve structure. This has been found to be a valuable improvement upon former structures and one which has not been suggested by former devices. It is my purpose to apply my apertured plate which I may refer to as the intermediate member, upon the exhaust pipe, and then secure the valve structure by suitable means directly to the said pipe. This has been found more satisfactory than to secure the intermediate member to the valve structure, and then secure the said member to the pipe.

It is a further object of my improved structure that it is readily adapted to application of valve structures of varying types to exhaust pipes of different sizes, and in my disclosure I shall describe several forms of valves all of which I may apply to the different size pipes by my improved attachment mechanism, thus making my device truly universal in its application.

The foregoing and other objects I prefer to carry out in the manner hereinafter fully described and as particularly pointed out in the claims, reference being made to the accompanying drawings, in which—

Figure 1 is a plan view of one form of my invention;

Figure 2 is a side elevation of the same shown applied to an exhaust pipe;

Figure 3 is an end view of the valve with the exhaust pipe in vertical section;

Figure 4 is a plan view of an intermediate member which I apply to the exhaust pipe;

Figure 5 is a transverse sectional view taken in the plane indicated by the line 5—5 of Fig. 4;

Figure 7 is a transverse view in vertical section of a modified form of valve;

Figure 8 is a side elevation of the same, a part being broken away to show the actuation of the pipe valve;

Figure 11:
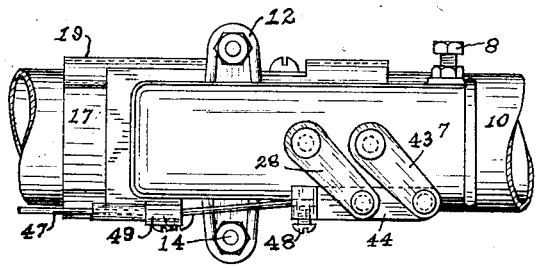
Figure 11 is a plan view thereof.

My improved mechanism is especially adapted for application to the periphery of an exhaust pipe, designated in the drawings by numeral 10, and comprises an elbow structure 5 having a base 6 for seating over an elongated aperture 15 in the exhaust pipe. This elbow has an outlet tube 7 which is provided with the usual screw 8 for penetrating the tube and securing therein an end of the pipe leading to the heater (not shown in the drawing). The base of the elbow is provided with an outwardly extending flange 11 and has an elongated port about which are provided downwardly-extending lateral edges 27 and arc shaped edges at the ends, all of said edges being adapted to fit the opening 15 in the exhaust pipe, though the curved outline of the ends need not be exactly parallel with the periphery of the pipe, since these edges will extend below the inner surface of the pipe, whatever the size of the latter.

Figure 6:
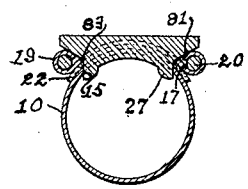
Figure 6 is a transverse section taken on the line 6—6 of Fig. 2.

For adjusting the position of the elbow upon exhaust pipes of different size, I provide an intermediate, flexible plate 17 having an elongated aperture 18 therein, the edges of the latter being regular in form and designed to rest directly over the aperture 15 in the pipe 10, and approximately in register with the bore 16 of the elbow member. The lateral outer edges of this plate are bent upward and inward to form partially closed cylinders 19 as shown clearly in Fig. 6, and in plan in Fig. 4. Cylindrical rods 20 are inserted in these cylinders 19, and the edges of the plate 17 including the cylinders and rods are bent down over the periphery of the exhaust pipe 10, the curve required for the plate when in position depending, of course, upon the radius of the pipe. Lateral ears 12 are provided for the base 6 through which extend bolts 14 whose lower ends are held in the ears 21 of the lower straps 13 which engage the lower surface of the pipe 10.

By the above described arrangement of parts, it will be seen that the bolts 14 will bear the base of the elbow against the intermediate plate by direct contact thereon, and press the cylinders 19 downward against the pipe. To further avoid leakage of gases between the plate and pipe, I provide an apertured mat or washer of fire proof material, such as wire-reinforced asbestos 22 of the same general outline as the bottom surface of the plate, and apply it between the plate and the pipe. The normal curve of the flexible plate 17 will be somewhat less than that of the pipe on which it will ordinarily rest, so that the flange 11 will be forced against the said cylinders at the lateral edges of the plate and press them positively downward, the cylinders tending to open or unroll when the pressure of the flanges is sufficient. In any case, the plate with its attached asbestos mat, will conform very accurately to the surface of the pipe, and avoid leaking of the gases from the exhaust pipe outward between the plate and pipe. The smaller the exhaust pipe to which the valve is applied, the greater arc will the flexible plate cover, but the contact between plate and pipe will be positive in any case.

It is my purpose to provide valves in the exhaust pipe and in the tube 7, one of which will always be closed when the other is in open position. I do this in the form shown in the first three views, as well as in Figs. 9, 10 and 11, by extending the flange 11 rearwardly, or in the direction away from the engine, to form a supporting extension 23 which is only slightly spaced from the pipe 7 at 24, as shown clearly in Figs. 2 and 9, to serve as a stronger base support in applying the elbow to the exhaust pipe, and to properly brace the vertical valve stem 25 which extends through the pipe 7 and said extension 23 down into the exhaust pipe, when the parts are assembled, and has mounted on its lower end the disc valve 26 which may be rotated by said stem to open or close the exhaust pipe. The upper end of the stem 25 is provided above the pipe 7 with an actuating lever for rocking the same and thereby the valve 26.

In the form shown in Figs. 1, 2 and 3, a lever 28 is provided for this purpose and at one end it is connected by a link 29 with an end 30 of a pivoted link 31 extending rearwardly beneath the link 29 and having further pivotal connection at its rear end with a vertical lever 32 which is pivoted intermediate its ends upon a fixed part connected with the tube 7. The lower end 33 of the lever 32 is provided with an eye connection 34 for suitable attachment of an actuating wire or other member.

In Figs. 1, 2, 3, 6 and 9 to 11, the tube or pipe 7 is also provided with a disc valve 35 mounted on a vertical stem 36 which has its bearings in the opposite walls of the pipe. And, in Figs. 1, 2, 3 and 6, on the upper end 37 of the stem outside the pipe 7, is mounted a long lever 38 one of whose ends 39 is connected with one end of the link 29, and the other end 40 has apertures in one of which, one end of a coiled tension spring 41 is attached, the other end of this spring being fixed in an ear 42 fixed to the forward end of the elbow 5, so that the normal tendency of the spring is to move the lever end 40 to the left in Fig. 1, which movement will rotate both valve stems 25 and 36 counter-clockwise, as seen in said view. The levers 28 and 38 are so mounted on their stems 25 and 36, respectively, that the normal tendency of this spring 41 is to position the valve 26 in an open, and the valve 35 in a closed relation to the pipe 10 and tube 7, respectively. An impulse given the connection 34 in a direction away from the engine will, consequently, move the stems 25 and 36 in a clockwise direction, as seen in Fig. 1, and will thereby close the valve 26 and at the same time open valve 35, so that the exhaust gases passing from the engine through the pipe 10 will be diverted from the latter and directed upward into the heater (not shown).

Figure 9:
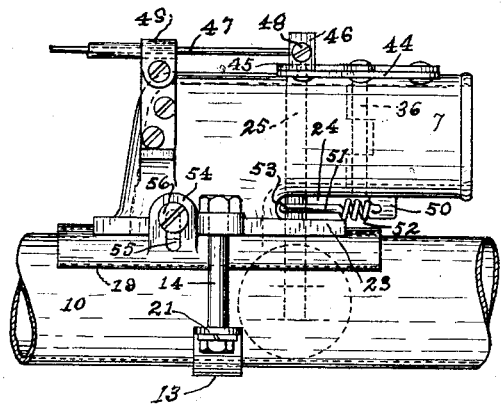
Figure 9 is a side elevation of a further modification.
Figure 10:
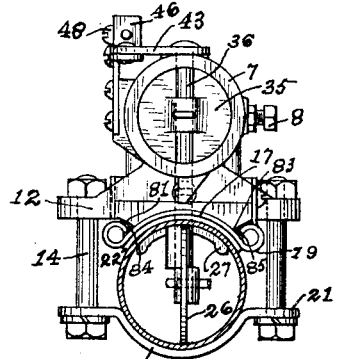
Figure 10 is an end view of this form.

In the particular form of valve structure shown in Figs. 9 to 11, the stem 36 which actuates the valve 35, is controlled by the lever 43 having about the same length as the lever 28 which actuates the stem 25 carrying the valve 26 in the exhaust pipe 10. These two levers 28 and 43 are actuated directly by the link 44 whose front end 45 is provided with an eye connection 46 for receiving therein the end of a wire or rod 47 which is secured in said eye by the screw 48 and is guided forwardly through an eye 49 mounted upon the forward end of the elbow, as shown in Fig. 9. In this view, with the levers 28 and 43 in the relative position shown in Fig. 11, the valve 26 is in the open position, and the valve 35 closed. Movement of the link 44 and rod 47 toward the engine will result in rotation of the stems 25 and 36 clockwise, as shown in Fig. 11, whereby the valve 26 will be closed and the valve 35 opened. In this structure just described, the actuation of the valves and their stems is produced by the rod 47 in either direction, as may be desired.

In the construction shown in Figs. 1, 2, 3, 9, 10 and 11, especially in Figs. 2 and 9, my arrangement of the valve mechanism and the actuating means therefor, enables me to provide an especially efficient means for avoiding rattling of the parts by the pulsating action of the gases from the engine of the internal-combustion type, and which will now be described. To the rear of the stem 25 and between parts 7 and 10, a lug 50 is mounted upon the tube 7 and extends down into the space 24 where it is perforated for receiving therein the end of a wire element 51 which includes a tension spring 52. The opposite end of this spring element 51 is provided with an open hook 53 which readily engages the stem 25 in the space 24, and thereby tends to pull the body of such stem 25 in a direction away from the engine. The structure including such wire 51 and its attaching ends serves effectively to abort any rattling sound of the stem in its bearings, and does this without seriously increasing any friction of the stem in its bearings or preventing its rotation when actuated. I regard this as a very valuable improvement, though simple in its construction.

The intermediate plate 17 is as well adapted for mounting upon the exhaust pipe 10 beneath the elbow structure of Figs. 9 to 11, as beneath that shown in Figs. 1, 2, 3 and 6. Its aperture 18 is always in register with the aperture 15 in the pipe 10 and the aperture or bore 16 in the elbow above. For further securing the plate 17 to the elbow, small transverse cuts are made in the cylinders 19 of this plate to provide ears 54 having slots 55 therein and these ears are bent upwardly for attachment to the edges of the flange 11, which attachment is effected usually by use of screws 56 inserted in the slots and entering suitable apertures in said flange. One of these ears is found to be sufficient for each side, though more may be used, if needed. They may be situated at proper positions on the cylinders, depending upon the particular type of elbow to be mounted, for I have designed my securing structure for use with many types of valves.

I have found also that my mounting plate 17 is adapted for use as intermediate member between the elbow and pipe 10, when quite different forms of elbow and valve structure are employed. I have illustrated in Figs. 7 and 8, a strikingly different form of valve from that shown in the other views, but which I will describe to make clear its equally adaptable use with said intermediate plate. In Figs. 7 and 8, the elbow member comprises two tubular sections integral and whose bores are in direct connection. The elbow rests upon the base member 57 having the rectangular, elongated aperture 58 which will be positioned in registration with the opening 15 in the pipe 10, this aperture 58 being provided with lateral, downwardly-extending edges 59, as do the edges 27 in the other forms. Rising above said base 57, the lower section 60 extends rearwardly at an incline whose forward portion is shown in Fig. 8 as a curved surface 61 which at the point 62 connects with the tubular section 63 which extends rearwardly for the distance 64 and then is directed upwardly somewhat at 65, as shown in Fig. 8. A horizontal valve 66 is mounted within the section 60 for rotation upon the shaft or stem 67, at one end 68 of which an actuating lever 69 is attached outside the valve wall.

This lever 69 normally projects upwardly and forwardly from its axis to a point 70 where one end of a link 71 is connected thereto, and an eye connector 72 is further provided thereon for actuating the lever, link and stem. Further rearwardly, a vertical stem 73 is mounted by being inserted in bearings in the walls of the tube section 63 at 82. The tube 65 and 63 is made quite secure in this form by being cast solid with the base 57, there being an apertured web 74 filling the otherwise open space between the base and tube. The stem 73 projects downwardly through the aperture in said web 74 and through the rearward end 75 of the base beyond the rear end of the opening 58, and down into the bore of the exhaust pipe 10 where it is carried by the elbow member as in the other forms. The usual lower valve 26 is mounted upon this lower end of the stem 73 for opening or closing the pipe 10, as desired.

The upper end of the stem 73 has attached thereto an actuating lever 91 normally projecting out transversely of the elbow structure where the outer end 76 thereof is pivoted to the end 77 of the link 71, so that actuation of the lever 69 upon the shaft 67 will by said link actuate the stem 73 and its valve 26. The link 71 is stamped from sheet metal and is of material permitting twisting of the lever stock through an arc of 90°, whereby the end 77 may swing in a vertical plane in its connection with the lever 75, while its forward end may pivot in an horizontal plane in connecting with lever 69. By such structure and connections, I am able to actuate a valve swinging in an horizontal axis and another in a vertical axis, all by the same mechanism. This permits mounting the horizontal axis or shaft in the inclined base section 60 and operating it with the same element as that actuating the vertical stem 73. To the connector 72 is detachably connected the usual wire or rod element 78 which is guided through the eye of a lug 79 mounted upon the forward end of the elbow.

In the views shown in Figs. 7 and 8, the parts are in such position as to close the valve 26 in the pipe 10, while the horizontal valve 66 is open. This position closes the elbow sections against entrance of gases from the pipe 10 into the radiator in the car. Movement of the rod 78 rearwardly in the view in Fig. 8 will open valve 26 and close 66. Lugs or stops 80 may be provided to prevent the lever 69 swinging too far in either direction.

In all the views, Figs. 1 to 3, and 6 to 11, the intermediate plate 17 is applied to the apertured pipe 10 with the aperture 16 or 58 of the elbow over the aperture 15 in the exhaust pipe, and the plate 17 therebetween with the aperture 18 registering substantially with the pipe and elbow apertures. The edges 27 or 59 of the elbow apertures are inserted in the opening 15 so that the elbow is held in position in such opening, the size of the pipe opening 15 being uniform whatever the size of the pipe itself. The base of the elbow, in all these forms here shown, has a greater transverse dimension than the width of the opening 15 in the pipe 10. The edges 27 or 59 have an outside width appreciably reduced from the said transverse dimension of the base, and a shoulder thereby results between such edges and the outer surface of the base, which in this construction I prefer to form in a beveled or inclined surface 81 which is shown very clearly in Figs. 3, 6, 7, and 10. While the apex 83 of the angle between the said edges and the surface 81 rests upon the edges of the opening 15, the weight of the valve and the downward pressure thereon by the bolts 14 tending to press the elbow down into such position, the surfaces 81 will rest upon the cylinders 19, and cause the latter to unroll from the rods 20, until the base of the elbow is in contact with both the pipe and such cylinders.

It has been explained above that since the mat 22 avoids leakage between the plate 17 and the pipe 10, there will evidently result from this assemblage, a longitudinal cavity 84 which is approximately triangular in cross section which, if not provided for, might permit leakage therethrough. I have therefore provided a wicking 85 of the proper transverse area to enable it to be crowded into this cavity 84 and serve therein as a packing to fully avoid leaking. The said wicking is of some fire-proof material, such as asbestos. While the absence of this small packing would not be a very wasteful matter, so far as the heat from the exhaust gases is concerned, the emission of the gases through such an open cavity is apt to give rise to an annoying whistling sound which this packing overcomes.

Some difficulty has been experienced in the past in making a leak-proof connection between a branch pipe and an apertured exhaust pipe, while at the same time providing valves in said exhaust pipe and in the branch pipe, with a common means for actuating both valves and also providing such valve mechanism as shall fit accurately upon its seat, though the supporting pipes may have varying cross-section. I have by this improved structure accomplished this desirable result as above explained, and have done so without attaching directly the edges of the slot in the plate 17 to any part. This greatly simplifies the connection of the valve and exhaust pipe, and has merely required a detachable connection between the outer edges of said plate and the elbow, which is done by providing the ears 54 on the cylinders 19 and securing them to the base of the elbow. All that is further required to make the connection doubly secure, is to connect the ears 12 with the strap 13 by bolts 14 which may readily be attached or removed.

What I claim and desire to secure by Letters Patent is:—

1. A cut-out valve comprising a pipe having an opening therein, an elbow through the inlet opening of which the bore of the elbow communicates with the bore of the pipe, a flexible plate of sheet metal having an opening therein, the outer lateral edges of said plate having upwardly bent ears secured to the base of the elbow, and means for securing said base to the pipe.

2. A cut-out valve comprising a pipe having a longitudinally elongated opening therein, an elbow having an inlet opening which corresponds in dimensions substantially with the pipe opening, a flexible plate of sheet metal adapted to be bent to conform to the curvature of said pipe and having means for securing it to the base of said elbow, a valve carried by said elbow and normally mounted in said pipe, a valve mounted in the branch pipe of said elbow on an axis spaced from that of the other valve, common means for actuating both valves together, so that one valve will always be closed when the other is open, and means independent of the plate securing means, for securing the elbow to the pipe.

3. A cut-out valve comprising a pipe having a longitudinally elongated opening therein, an elbow having an inlet opening which corresponds in dimensions substantially to the pipe opening, a flexible plate of sheet metal having an opening therein a portion of the outer lateral edges of the plate turned upwardly and secured to the base of the elbow, valves mounted within the main pipe and the branch pipe, respectively, both valves being carried by the elbow, means for actuating both valves in unison but at different angles in the respective pipes, so that either of them will be open when the other is closed, and means independent of the plate for securing the said base to said pipe.

4. A cut-out valve comprising a pipe having a longitudinally elongated opening therein, an elbow having an inlet opening which corresponds in dimensions substantially with the pipe opening, a flexible, apertured plate of sheet metal connected to the inlet end of said elbow and adapted to be bent to conform to the curvature of said pipe, a valve carried by said elbow and mounted in said pipe rearwardly of the opening in the latter, means for actuating the said valve, clips for securing said plate to said elbow and means independent of the clips for securing the elbow to said pipe.

5. A cut-out valve comprising a pipe having a longitudinally elongated opening therein, an elbow having an inlet opening which affords communication between the pipe and elbow, means for securing the elbow to said pipe and flexible means intermediate the pipe and elbow having varying transverse dimensions for adjustably seating an elbow of standard size upon pipes of different sizes.

6. A cut-out valve comprising an elbow the opening at one end thereof having inturned edges whose outer dimensions are substantially that of an elongated opening in an exhaust pipe upon which said elbow is to be seated, a flexible plate of sheet metal having an opening therein, the outer lateral edges of said plate being normally bent upward and inward to form hollow cylinders, rods inserted in said hollow cylinders, lateral flanges on the base of said elbow normally resting upon the cylinders of said plate and tending to unroll the latter from said rods as the elbow is forced into contact with said pipe, separate valves mounted for rotation in the exhaust pipe and branch pipe respectively, means for actuating said valves in unison, and means for securing said base to said exhaust pipe.

7. A cut-out valve comprising a pipe having an opening therein an elbow having an opening therethrough which communicates with the pipe opening at one end and a branch pipe at the other, there being downwardly projecting edges from said elbow about the opening therein, a flexible plate of sheet metal having an opening therein registering substantially with the openings in the elbow and pipe, the outer lateral edges of said plate being rolled upward and inward to form hollow cylinders normally spaced slightly less than the width of said base edges, ears integral with said cylinders detachably secured to the sides of said elbow, a valve mounted within the bore of said branch pipe and means of securing said elbow to said pipe.

8. A cut-out valve comprising an elbow having an inlet opening for affording communication between the rectangular opening in an exhaust pipe upon which the elbow is seated, and a branch pipe connected with said elbow, there being downwardly-projecting edges from the said inlet opening, a flexible plate of metal having an opening therein for positioning intermediate the elbow and exhaust pipe, the outer lateral edges of said plate being rolled upward and inward forming cylinders normally spaced apart slightly less than are the edges of the said inlet opening, a vertical stem mounted on bearings in the walls of said branch pipe and the base of said elbow and passing through the space between said pipe and base and extending down into said exhaust pipe, a valve mounted on said stem in said exhaust pipe, a tension spring secured at one end to a fixed part of the elbow and having a hook part at the opposite end engaging said stem in said space, and means for securing said elbow to said exhaust pipe.

9. A cut-out valve comprising an elbow having an inlet opening for affording communication between the opening in an exhaust pipe upon which the elbow is seated, and a branch pipe connected with said elbow and spaced from its base, means for securing said elbow in position on said exhaust pipe, a valve stem mounted in the walls of said elbow and passing through said space and extending down into said exhaust pipe, a valve in the latter mounted on said stem, and a tension spring secured at one end to a fixed part and having a hook at the opposite end engaging said stem in said space, so that it tends to urge said stem laterally against its bearings and thereby avoid rattling of the parts.

10. A cut-out valve mechanism comprising an elbow adapted to be seated over an opening in an exhaust pipe and having means for mounting a valve in said pipe and actuating it by connections outside said pipe, an intermediate flexible plate positioned between the elbow and pipe and having an aperture positioned over the pipe opening, the edges of the plate aperture being regular in outline and the lateral edges of the plate being rolled inward and upward to normally resist the forcing of the elbow against the plate and pipe, means connected with said plate edges for securing the latter to the elbow, and means for securing the elbow to the pipe.

11. A cut-out valve mechanism comprising a pipe having an opening therein, a casing having an opening therethrough which communicates with the pipe opening at one end and a branch pipe at the other, there being downwardly projecting edges from said casing about the opening therein, a flexible plate of sheet metal having an opening therein registering substantially with the openings in the casing and pipe, the outer lateral edges of said plate being rolled upward and inward to form hollow cylinders normally spaced slightly less than the width of said base edges, ears integral with said cylinders detachably secured to the sides of said casing, a valve mounted within the bore of said branch pipe and means for securing the said casing to said pipe.

12. A cut-out valve mechanism comprising a double-ended casing including a branch pipe integral therewith adapted to be seated over an opening in an exhaust pipe, an apertured plate of flexible material and adjustably positioned intermediate the casing and pipe and having means connected with its outer lateral edges for securing it to the casing, a valve mounted within the exhaust pipe, a vertical stem carrying said valve thereon and extending upward through the casing, a valve mounted within said integral structure, a valve shaft carrying said valve thereon and mounted on the walls of the said integral structure, unitary means for actuating said stem and shaft together, and the valves being so mounted on the shaft and stem that either will be open when the other is closed, and means independent of the plate securing means, for securing the casing to the exhaust pipe.

13. A cut-out valve mechanism comprising an elbow adapted to be seated over an opening in an exhaust pipe, an apertured, flexible plate adjustably positioned intermediate the elbow and pipe and having means connected with its outer lateral edges for securing it to the elbow, a valve mounted within the exhaust pipe, a vertical stem carrying said valve thereon and extending upward through the elbow, a branch pipe integral with said elbow, a valve mounted within said integral pipe and elbow, a valve shaft carrying said valve thereon and mounted on the walls of the said integral structure, unitary means for actuating said stem and shaft together and the valves being so mounted on shaft and stem that either will be open when the other is closed, and means independent of the plate securing means, for securing the elbow to the exhaust pipe.

14. A cut-out valve comprising an elbow the opening at one end thereof having inwardly-turned edges whose outer dimensions are substantially that of an opening in an exhaust pipe upon which said elbow is to be seated, the width of the body of the elbow being larger than the reduced edges about said opening whereby shoulders result which rest upon the outer surface of the exhaust pipe, a flexible plate of metal having an opening therein, the outer lateral edges of said plate being normally bent upward and inward to form hollow cylinders tending to resist the downward force of said shoulders resting thereon, valves in said exhaust pipe and in said elbow, respectively, and means for actuating said valves in unison, and means for securing said elbow upon said exhaust pipe.

In witness whereof I have hereunto set my hand this 7 day of May, 1926.

ASA E. LINENDOLL.